UNITED STATES PATENT OFFICE.

HORATIO A. BLACK, OF TOPEKA, KANSAS.

DENTAL FILLING AND PROCESS OF MAKING SAME.

1,294,355.     Specification of Letters Patent.     Patented Feb. 11, 1919.

No Drawing.     Application filed April 27, 1918. Serial No. 231,289.

*To all whom it may concern:*

Be it known that I, HORATIO A. BLACK, a citizen of the United States, residing at Topeka, in the county of Shawnee and State of Kansas, have invented certain new and useful Improvements in Dental Fillings and Processes of Making Same, of which the following is a specification.

The object of my invention is the use of celluloid, pyroxylin and other suitable nitrocellulose substances as a filler for cavities in teeth and wherever it may be applicable.

A difficulty to overcome in the handling of such substances for such purposes is that they can not be reduced to powder form so as to render them conveniently available for such work; and another difficulty is that when reduced to a plastic state they expand abnormally and then on drying shrink abnormally so as to make them unfit for such fillers.

To overcome these difficulties and to attain the object of my invention, I combine with the nitro-cellulose certain other ingredients and treat the same in such manner as to make the same reducible to a powder and make a powder thereof, and then by the use of a solvent make a paste which may be conveniently filled into the cavity or other mold and which will quickly harden and solidify without objectionable shrinkage; also one of the ingredients gives to the composition an adhesive quality necessary especially in dental work. And my invention comprises the compositions and the steps in making and using the same as hereinafter set forth and claimed.

In the description of the compositions and process of making and using the same as hereinafter set forth, I have explained what I deem to be the best mode of utilizing the principles involved in my invention; but it will be understood that my invention is not confined to the exact details of the description, and that, within the scope of the appended claims, I contemplate changes in proportions and materials, and the substitution of equivalent elements and steps, without departing from the spirit of my invention.

The ingredients used are: a suitable nitrocellulose substance, such as celluloid or its equivalent; a solvent for the celluloid, such as acetone; a suitable hard gum, such as gum amber or its equivalent; a solvent for the gum amber, such as chloroform; and a hard, non-absorbent, insoluble and powdered substance, such as silica ($SiO_2$) or its equivalent.

By the addition of acetone I reduce the celluloid to the consistency of thick butter cream. I make a saturated solution of gum amber in chloroform. I mix one part of the celluloid paste with about two-fifths part of the gum amber solution and about one-fourth part by weight of powdered silica; the mixing being done thoroughly in a closed receptacle to prevent evaporation of the solvents. After the mass is thoroughly mixed, it is spread or rolled into thin sheets about two-one-thousandths of an inch thick, though it will be understood that the exact thickness is immaterial, the thin sheets facilitating drying and powdering. These sheets when dry form a hard brittle mass which may be powdered; and I reduce the same to a powder by any suitable means.

The powder composed and made as set forth in the last preceding paragraph is a commercial article capable of being conveniently handled in suitable receptacles such as glass bottles or vials of shapes and sizes adaptable for the trades and professions.

The final step, which may be best illustrated as applied to dental work, is to form a paste of the powder with a suitable solvent, and press the paste into the cavity to fill it and then permit it to dry and solidify. Preferably the drying and solidifying is hastened by the application of hot air. And preferably the solvent used is composed of two parts acetone to about one part by weight of a saturated solution of gum amber in chloroform. This is not and need not be a complete solvent for the powder, but sufficient to form a paste therewith.

Advantages of the use of celluloid and other low-grade nitro-cellulose substances in dental work are well-known in the art. The addition of the powdered silica is of twofold use; first, it makes the first-described mixture or composition reducible to a powder; and second, it prevents the last-described paste from shrinking upon drying and solidifying to any objectionable degree. The gum amber serves the purpose of a binder to hold the particles of the mass together and also gives to the mass the quality of adhesiveness causing it to adhere to the walls of the cavity. The use of the gum amber solution in the final solvent is desirable in order to prevent the celluloid from separating from the silicon while the mass is being worked into or handled in the plastic state.

So far as I am aware, the solvents, the acetone and the chloroform, are not retained in the dry mass, either the powder or the final filling; and they are employed merely as vehicles for securing a complete and intimate mixing of the other ingredients into a proper uniform homogeneous mass.

The resulting filling is a hard and durable filling fitting closely in the cavity or mold and adhering to the walls thereof.

In referring to the silica or its equivalents as "insoluble", I refer only to those solvents used in the composition or likely to be encountered in the ordinary or proper use of the powder or final filling.

Having thus described my invention, what I claim is:

1. The herein described process of making a commercial nitro-cellulose powder, consisting of forming a nitro-cellulose paste and a saturated solution of gum amber, and mixing said paste and said solution together with powdered silica, then drying the mixture in a thin sheet, and then pulverizing the same.

2. The herein described composition of matter consisting of nitro-cellulose, hard gum and powdered silica.

3. The herein described composition of matter consisting of celluloid, gum amber and powdered silica.

4. The herein described composition of matter consisting of approximately one part by weight nitro-cellulose, two-fifths part gum amber measured in saturated solution in chloroform, and one-fourth part powdered silica.

In testimony whereof I have hereunto affixed my signature.

HORATIO A. BLACK.